United States Patent [19]
Krampitz

[11] Patent Number: 5,492,203
[45] Date of Patent: Feb. 20, 1996

[54] RAILROAD CAR BRAKE CYLINDER PISTON TRAVEL INDICATOR AND MOUNT THEREFOR

[75] Inventor: Mark S. Krampitz, Hunker, Pa.

[73] Assignee: Westinghouse Air Brake Company, Wilmerding, Pa.

[21] Appl. No.: 402,248

[22] Filed: Mar. 10, 1995

[51] Int. Cl.⁶ .................................................. F16D 66/02
[52] U.S. Cl. ........................... 188/1.11; 116/208; 92/5 R
[58] Field of Search .......................... 188/1.11; 116/208; 92/5 R; 192/30 W; 340/454; 200/83 R, 83 D; 91/1

[56] References Cited

U.S. PATENT DOCUMENTS

| | | | |
|---|---|---|---|
| 2,912,536 | 11/1959 | Hoch | 92/5 R |
| 2,914,630 | 11/1959 | Ralston | 188/1.11 WE |
| 3,298,466 | 1/1967 | Ayers, Jr. et al. | 92/5 R |
| 3,359,869 | 12/1967 | Avrea | 188/1.11 |
| 4,989,537 | 2/1991 | Hutchinson, Sr. et al. | 116/208 |
| 5,244,061 | 9/1993 | Hoyt et al. | 188/1.11 |

Primary Examiner—Douglas C. Butler
Attorney, Agent, or Firm—Gary J. Falce

[57] ABSTRACT

A visual brake cylinder piston travel indicator for a railroad car having a brake cylinder device located remotely from a convenient viewing area. An indicator rod is suitably sized and configured to extend from the remote brake cylinder device to the viewing area where the brake cylinder piston travel may be determined by the relationship of the indicator rod end with respect to a reference point. At the brake cylinder device, the indicator rod is connected to the piston hollow rod by a bearing assembly that includes the hollow rod collar. The bearing assembly provides for relative rotation between the indicator rod and hollow rod, while concurrently transmitting axial movement of the piston to the indicator rod, such relative rotation being necessitated by the fact that the piston and hollow rod typically rotate during reciprocal movement between a brake application and brake release position, due to torsional forces imparted by the piston return spring.

9 Claims, 2 Drawing Sheets

RAILROAD CAR BRAKE CYLINDER PISTON TRAVEL INDICATOR AND MOUNT THEREFOR

BACKGROUND OF THE INVENTION

The present invention relates to railroad car brake cylinder piston travel indicators and particularly to the mounting arrangement for affixing such an indicator to the brake cylinder piston assembly.

Freight trains typically undergo a pre-departure terminal test in which the air brake equipment of each car is inspected prior to the train being cleared to proceed from the train make-up yard. This inspection requires a trainman to "walk the train" visually checking each car's brake equipment. During this inspection, the extended and retracted condition of the brake cylinder piston rod is noted as an indication of the car's brakes being operative. Moreover, the degree of piston rod extension beyond a nominal range provides an indication of such brake system malfunctions as an improperly or non-operative slack adjuster device, for example.

In the case of traditional style freight cars, the brake rigging arrangement is such that the brake cylinder piston rod can be readily viewed by a trainman "walking the train". On specialty type cars, however, their design often requires placement of the brake cylinder device in a location that is obstructed from view. It thus becomes burdensome to monitor the applied and release condition of the brake cylinder piston rod and consequently more time consuming to complete the terminal test, particularly on trains having a relatively high number of these specialty type cars.

SUMMARY OF THE INVENTION

It is an object of the present invention to provide a brake cylinder piston travel indicator for providing visual knowledge of the position of a brake cylinder piston when a brake cylinder device is mounted in an inaccessible viewing location on a railroad car.

It is another object of the invention to provide such a visual brake cylinder piston travel indicator that is compatible with brake cylinder operation.

A still further object of the invention is to provide a visual brake cylinder piston travel indicator that is universal for use with different standard brake cylinder sizes.

Briefly, and in accordance with the foregoing objectives, there is provided a visual brake cylinder piston travel indicator for a brake cylinder device that is mounted remote from a preferred viewing area of the railroad car and includes a rotatable piston member that is axially operable between a brake application position and a brake release position. The piston travel indicator comprises a hollow rod fixed to the piston member and having one end projecting from the body of the brake cylinder device, and a collar on the projecting end of the hollow rod to which a bearing assembly is connected for axial movement therewith between application and release positions of the piston member, during which movement the hollow rod is free to rotate relative to the bearing member. An indicator rod is connected at its one end to the bearing assembly and extends to the viewing area of the railroad car to provide a visual indication of the position of the piston member.

BRIEF DESCRIPTION OF THE DRAWINGS

These and other objects and advantages of the present invention will become more apparent from the following more detailed explanation when taken in conjunction with the accompanying drawings in which.

DESCRIPTION AND OPERATION

Figure 1:
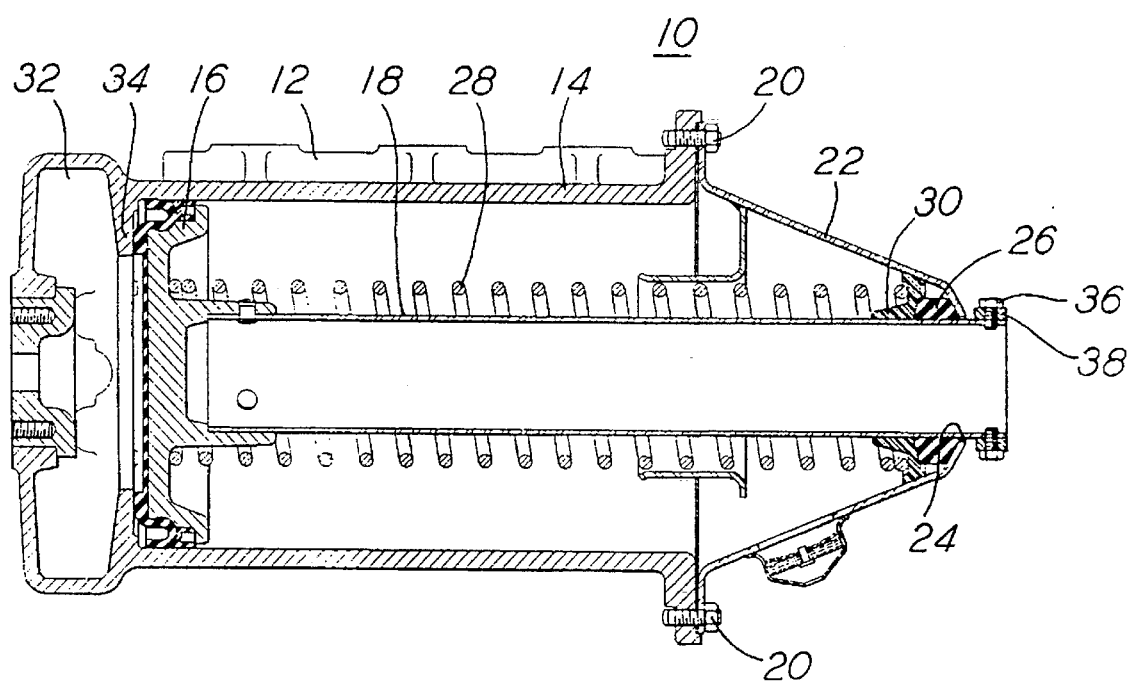
FIG. 1 is a section view of a standard railroad car brake cylinder device with which the piston travel indicator of the present invention is applicable.

Referring now to FIG. 1, the shown brake cylinder device 10 is the standard type employed on freight type railroad cars, being mounted on the underside of the car body (not shown) by means of bolts (also not shown) that pass through a mounting flange 12 formed integral with the brake cylinder body 14. A piston member 16 having a hollow rod 18 connected thereto by rivets is reciprocally operative in the cylinder body 14. Connected by bolts 20 to body 14 at its open end is a non-pressure head 22 having an end opening 24 through which hollow rod 18 passes. Surrounding hollow rod 18 and secured in place against the internal wall of non-pressure head 22 adjacent end opening 24 is an annular seal 26 that precludes the entry of moisture and foreign matter from the cylinder. A piston return spring 28 acts between the piston member and a spring seat 30 that surrounds hollow rod 18 and bears against the non-pressure head 22. Spring 28 thus serves to retain seal 26 in place, as well as urging piston member 16 in a brake release direction. In the absence of compressed air in pressure chamber 32, piston member 16 is intended to be engaged with a stop 34 formed on cylinder body 14 to define a brake release position.

When compressed air is supplied to chamber 32, piston member 16 is displaced from stop 34, compressing spring 28, there being a predetermined nominal degree of piston travel before the piston member 16 reaches a brake application position, as defined by brake shoe engagement with the wheel treads of the railroad car. In order to maintain this predetermined nominal piston travel relatively constant with brake shoe/wheel tread wear etc., a slack adjuster device (not shown) is typically employed in the brake rigging between brake cylinder device 10 and the brake shoes.

Affixed by screws 36 to the outer periphery of hollow rod 18 at the projecting end thereof is an annular collar 38. The side of collar 38 adjacent end opening 24 of non-pressure head 22 is spaced-apart slightly from non-pressure head 22 in release position of piston member 16 to assure positive engagement of piston member 16 with stop 34. Collar 38 serves the purpose of constraining piston member 16 and spring 23 when the non-pressure head is unbolted from brake cylinder body 14. This prevents the unsafe possibility of the piston member and return spring 23 "flying apart" during disassembly.

Figure 4:
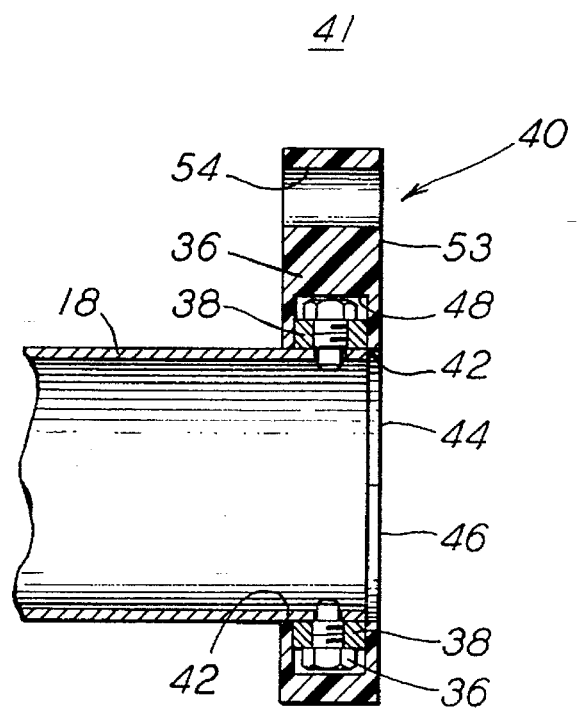
FIG. 4 is a partial section view taken along the lines IV—IV in FIG. 3.
Figure 2:
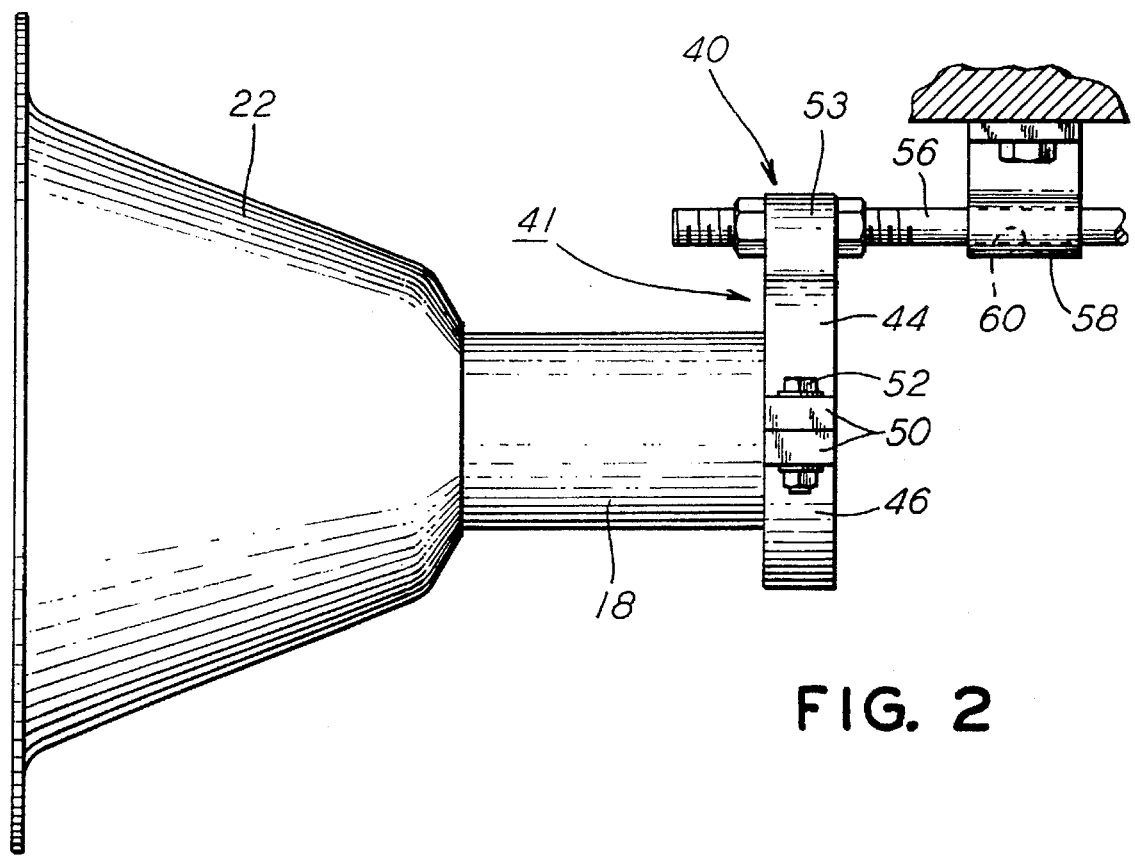
FIG. 2 is a partial outline view showing the piston travel indicator of the present invention assembled on the hollow rod of the brake cylinder device of FIG. 1.
Figure 3:
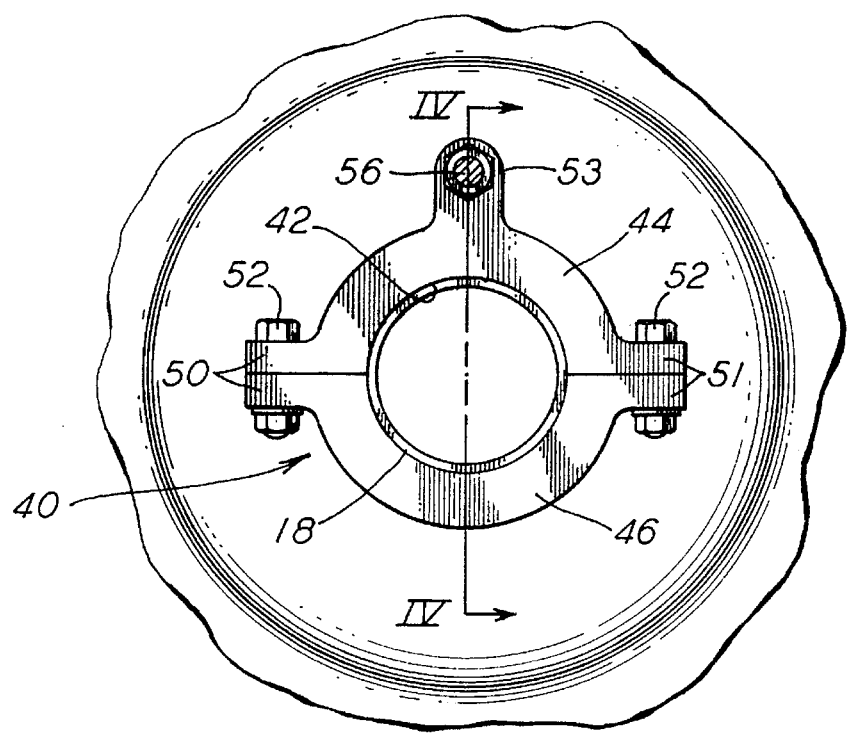
FIG. 3 is an end view in outline showing the piston travel indicator assembled on the brake cylinder hollow rod.

In FIGS. 2, 3 and 4 is shown a bearing member 40 having a central aperture 42 that is sized to fit over the projecting end of hollow rod 18. Preferably, bearing member 40 is made from a long wearing, low friction plastic material such ultra high molecular weight polyethylene. The bearing member 40 is split in half along a plane passing through the axis of central aperture 42, thus forming an upper clamping segment 44 and a lower clamping segment 46. The respective clamping segments have an annular recess 48 formed in central aperture 42, and diametrically opposed lugs 50 and 51 at the interface of the respective clamping segments. Bearing member 40 is segmented in the above manner to permit assembly onto the hollow rod collar 38.

The depth of annular recess 48 is such that no interference occurs between bearing member 40 and screws 36 of collar 38, when the upper and lower clamping sections 44, 46 of bearing member 40 are secured together, as by bolts 52 at lugs 50, 51. On the other hand, the width of recess 48 is only slightly greater than the width of collar 38 so that a relatively snug fit is provided between the sides of the hollow rod collar and the adjacent sides of recess 48, in order to transmit axial piston movement to bearing member 40 without any substantial lost-motion. It will be appreciated from the foregoing that bearing member 40 is cooperatively arranged with hollow rod collar 38 to provide a bearing assembly 41, whereby relative rotation is obtained between bearing member 40 and hollow rod 18 to which collar 38 is affixed, for a purpose hereinafter explained. Moreover, this relative rotation is substantially free of frictional resistance, due to the fact that the material of at least bearing member 40 is low friction plastic.

Formed on upper clamping segment 44, preferably midway between diametrically opposed lugs 50, 51 is a mounting lug 53 having an opening 54 through which a screwthreaded end of an indicator rod 56 passes. A nut on each side of mounting lug 53 is threaded onto indicator rod 56 to adjustably fix the length of indicator rod 56 between bearing member 40 and a predetermined viewing area of the railroad car. The indicator rod is suitably bent as necessary to avoid obstructions, depending upon the configuration of a particular railroad car, so that its other end terminates within the predetermined viewing area of the railroad car. Finding such an appropriate pathway for the indicator rod is facilitated by reason of the bearing member 40 being rotatable through a full range of 360°, and further by reason of the adjustable length of the indicator rod.

When the desired angular disposition of bearing member 40 has been determined, the position is fixed by means of a hanger bracket 58 that is preferably located approximate bearing member 40, to thereby limit further angular rotation of the bearing member. An opening 60 is provided in hanger bracket 58 to receive the indicator rod such that only movement in an axial direction can take place. Additional hanger brackets (not shown) may be installed along the length of indicator rod 54 to further support and guide the indicator rod.

With bearing member 40 rotatably fixed, as explained, piston travel between application and release positions is transmitted from hollow rod 18 to indicator rod 56 to provide at the terminus end thereof an indication of the degree of piston travel, notwithstanding the fact that piston member 16 and hollow rod 18 typically rotate during such piston travel. This rotation of piston member 16 and hollow rod 18 is due to the torsional effect of spring 28 during spring compression and contraction, such torsional action being transmitted from spring 28 to piston member 16 and thence to hollow rod 18. As will now be apparent, bearing assembly 41 accommodates rotation of the hollow rod collar 38 within recess 42 of rotatably fixed bearing member 40, while concurrently transmitting the axial movement of hollow rod 18 and collar 38, which acts via the right hand side of recess 42 to drive bearing member 40 and indicator rod 56 in a right hand direction as viewed in the drawing. The terminus end of indicator rod 56 may be appropriately marked with paint, for example, to permit viewing the indicator rod relative to a fixed reference point, such as a guide tube (not shown) through which the terminus end of indicator rod 54 projects. In this manner, the condition of the brake equipment can be monitored by visually determining the degree of piston travel from a convenient viewing area of the railroad car, even when the railroad car design requires remote mounting of the brake cylinder device.

I claim:

1. A visual brake cylinder piston travel indicator for a railroad car having a brake cylinder device mounted remotely from a predetermined viewing area of the railroad car and including a rotatable piston member axially operable between a brake application position and a brake release position, said visual brake cylinder piston travel indicator comprising:

a) a hollow rod fixed to said piston member and having one end projecting from the body of said brake cylinder device;

b) a collar fixed on said projecting end of said hollow rod;

c) a bearing assembly connected to said collar for axial movement therewith between said application and release positions of said piston member, said collar being rotatable relative to said bearing assembly during said axial movement thereof; and d) an indicator rod connected to said bearing assembly and adapted to extend therefrom to said predetermined viewing area of said railroad car to provide a visual indication of the position of said piston member.

2. A brake cylinder piston travel indicator as recited in claim 1, wherein said collar is upraised from and extends at least partially around the periphery of said hollow rod, said bearing assembly comprising:

a) an annular bearing clamp having a central aperture through which the projecting end of said hollow rod extends and an annular recess formed in said central aperture; and b) said collar being disposed in said annular recess to provide said connection of said bearing assembly with said collar.

3. A brake cylinder piston travel indicator as recited in claim 2, wherein said bearing clamp comprises:

a) first and second segments, said first and second segments being separated along a plane of the axis of said central aperture to provide for assembly of said bearing clamp onto said hollow rod collar;

b) means for clamping said first and second segments together; and c) said indicator rod being connected to one of said first and second segments.

4. A brake cylinder piston travel indicator as recited in claim 3, wherein the connection of said indicator rod with said one of said first and second segments is adjustable in the axial direction of movement of said piston member between said brake application and brake release positions.

5. A brake cylinder piston travel indicator as recited in claim 2, wherein at least one of said collar and said annular bearing clamp is formed from a low friction plastic material.

6. A brake cylinder piston travel indicator as recited in claim 2, wherein said bearing assembly is made from an ultra-high molecular weight plastic material such as polyethylene.

7. A brake cylinder piston travel indicator as recited in claim 2, wherein said bearing assembly is rotatable through a range of 360° relative to said collar.

8. A brake cylinder piston travel indicator as recited in claim 7, wherein said collar extends continuously around the periphery of said hollow rod.

9. A brake cylinder piston travel indicator as recited in claim 8, wherein the depth of said recess is greater than the height of said collar.

* * * * *